(12) United States Patent
Bertrand et al.

(10) Patent No.: US 7,218,669 B2
(45) Date of Patent: May 15, 2007

(54) WIRELESS COMMUNICATION SYSTEM OPERATING IN RESPONSE IN PART TO TIME SIGNALS FROM THE GLOBAL POSITION SATELLITE SYSTEM

(75) Inventors: Pierre Bertrand, Antibes (FR); Sundararajan Sriram, Plano, TX (US); Eric Biscondi, Opio (FR); Frank Honore, Boston, MA (US)

(73) Assignee: Texas Instruments Incorporated, Dallas, TX (US)

( * ) Notice: Subject to any disclaimer, the term of this patent is extended or adjusted under 35 U.S.C. 154(b) by 1255 days.

(21) Appl. No.: 10/174,376

(22) Filed: Jun. 18, 2002

(65) Prior Publication Data

US 2003/0231613 A1 Dec. 18, 2003

(30) Foreign Application Priority Data

Jul. 2, 2001 (EP) .................................. 01401766

(51) Int. Cl.
*H04B 1/38* (2006.01)

(52) U.S. Cl. ...................................... 375/219

(58) Field of Classification Search ................ 375/219, 375/220, 221, 222, 356
See application file for complete search history.

(56) References Cited

U.S. PATENT DOCUMENTS 6,788,663 B2 * 9/2004 Rowitch ..................... 370/335

* cited by examiner

*Primary Examiner*—Emmanuel Bayard
(74) *Attorney, Agent, or Firm*—Ronald O. Neerings; Wade James Brady, III; Frederick J. Telecky, Jr.

(57) ABSTRACT

A wireless communication system (10). The system comprises a transceiver (20), and the transceiver comprises a code counter (LCSTC 22c) and a clock oscillator (26) for advancing a count in the code counter. The transceiver further comprises circuitry (30) for receiving a time message based on a system time external from the transceiver and circuitry (28) for determining a system time count and for storing the system time count to the code counter in response to the time message. Further, code counter continues to be advanced from the system time count in response to the clock oscillator. The transceiver further comprises circuitry (28) for repeatedly evaluating the count in the code counter, after advancement from the system time count, to ascertain whether the count has drifted to an inaccurate count. Lastly, the transceiver further comprises circuitry (28), responsive to detecting an inaccurate count, for adjusting the inaccurate count to a perceived accurate count.

26 Claims, 4 Drawing Sheets

WIRELESS COMMUNICATION SYSTEM OPERATING IN RESPONSE IN PART TO TIME SIGNALS FROM THE GLOBAL POSITION SATELLITE SYSTEM

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to wireless communications systems and are more particularly directed to a wireless transceiver that performs signal operations in response in part to timing signals received from the global position satellite system.

Wireless communications have become prevalent in business, personal, and other applications, and as a result the technology for such communications continues to advance in various areas. One such advancement includes the use of spread spectrum communications, including that of code division multiple access ("CDMA"). In such communications, a user station (e.g., a hand held cellular phone) communicates with a base station, where typically the base station corresponds to a "cell." CDMA systems are characterized by simultaneous transmission of different data signals over a common channel by assigning each signal a unique code. This unique code is matched with a code of a selected user station within the cell to determine the proper recipient of a data signal.

CDMA continues to advance along with corresponding standards that have brought forth a third generation CDMA also referred to as 3G cellular. 3G cellular includes two standards, namely, IS2000 which is Qualcom based and supports IS95 in one operational mode, and a wideband CDMA which is also referred to as WCDMA and which has a 3GPP standard. Communications performed under these standards require a timing reference so as to support encoding and synchronized decoding of the communications. For example, one level of such encoding is the use of signal spreading such as using a Walsh code. As another example, CDMA communications may be encoded through the use of both a long code and a short code. In order to properly encode the communications for transmission, the short and long codes must be properly synchronized to some reference time. In addition, when these communications are received by a user station, the user station synchronizes its operation with respect to the short and long code of the transmitting base station and, thus, the user station also necessarily relies on the proper synchronization of the base station with respect to its short and long code.

Given the need for a timing reference, and in the instance of IS2000 by way of example, one present state of the art base station includes a global position receiver that obtains its timing reference in response to signals from the known global position satellite ("GPS") system. The GPS system is commonly known to transmit geographic positioning information but such information is not used in the present context; instead, the GPS system is also known to issue a periodic pulse along with a time message every second according to an atomic clock. In CDMA, one state of the art base station uses both the GPS pulse as well as the corresponding time message. The time message is used to initialize a value in a chip count register while the frequency of the pulse provides a reference into a local oscillator within the receiver. Specifically, the oscillator includes a phase locked loop ("PLL") that locks its frequency in response to the frequency of the GPS pulse. The locked frequency is then used to generate a local master clock signal that is used by the receiver to increment the chip count register. Thus, once the chip count register stores a value in response to the time message, the count is then incremented by the local PLL oscillator.

While the above-described state of the art has been shown to provide an operable base station for purposes of synchronizing the base station and thereby to facilitate synchronized transmissions, the present inventors have observed that such an approach also provided various limitations and drawbacks. For example, because the master clock is locked to the GPS timing by way of a PLL, the undesirable phase noise that is inherent in a PLL setup is introduced into the timing signals. As another drawback, the reduction of such noise requires a sophisticated PLL that is therefore relatively complex to implement and increases cost, and cost increases are themselves highly undesirable and indeed sometimes unacceptable in the continued advancement of the competitive market for cellular devices. As another drawback, the master clock signal from the preceding approach is used to clock various devices as would be expected of a master signal, while in fact only certain receive and transmit functions require the synchronization such as to perform correlation operations. However, as a master clock signal, the PLL-induced noise in that master clock signal also affects other circuits within the receiver and, indeed, those affected circuits often therefore require clock phase corrections. Still other drawbacks and limitations may be observed by one skilled in the art.

In view of the above, there arises a need to provide an approach for an improved wireless transceiver operating in synchronization to a system or other universal time signal, as is achieved by the preferred embodiments discussed below.

BRIEF SUMMARY OF THE INVENTION

In the preferred embodiment, there is a wireless communication system. The system comprises a transceiver, and the transceiver comprises a code counter and a clock oscillator for advancing a count in the code counter. The transceiver further comprises circuitry for receiving a time message based on a system time external from the transceiver and circuitry for determining a system time count and for storing the system time count to the code counter in response to the time message. Further, the code counter continues to be advanced from the system time count in response to the clock oscillator. The transceiver further comprises circuitry for repeatedly evaluating the count in the code counter, after advancement from the system time count, to ascertain whether the count has drifted to an inaccurate count. Lastly, the transceiver further comprises circuitry, responsive to detecting an inaccurate count, for adjusting the inaccurate count to a perceived accurate count. Other circuits, systems, and methods are also disclosed and claimed.

DETAILED DESCRIPTION OF THE INVENTION

Figure 1:
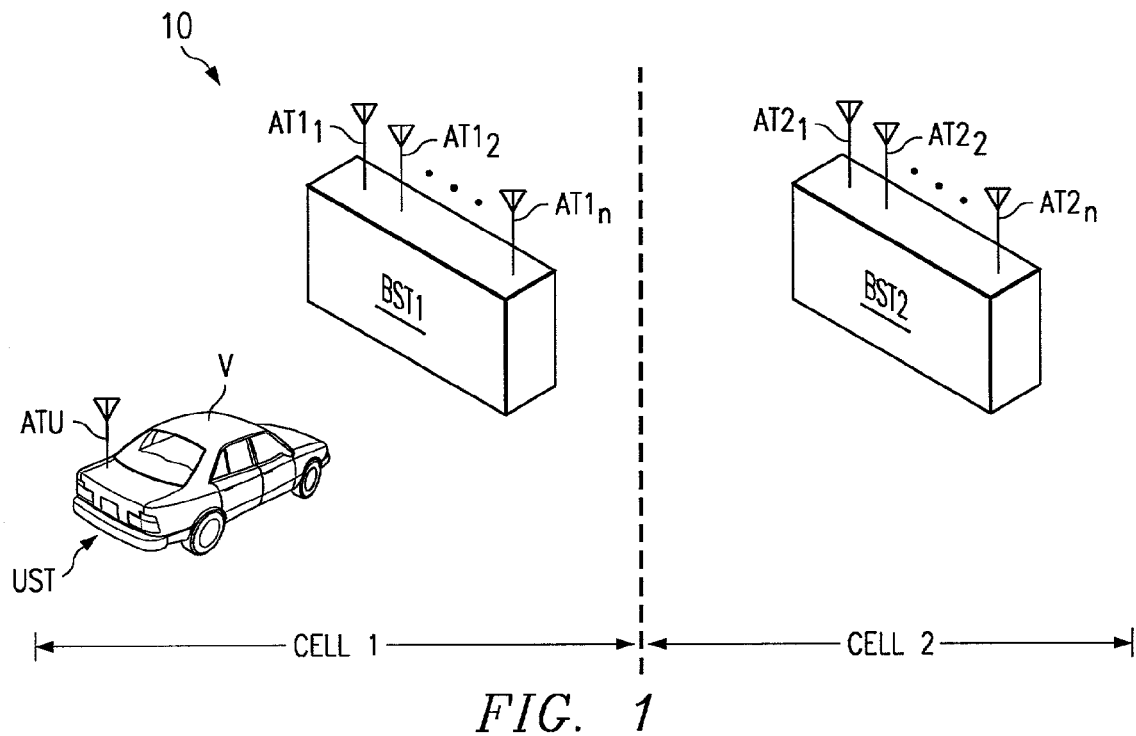
FIG. 1 illustrates a diagram of a cellular communications system by way of a contemporary code division multiple access ("CDMA") example in which the preferred embodiments operate.

FIG. 1 illustrates a diagram of a cellular communications system 10 by way of a contemporary code division multiple access ("CDMA") example in which the preferred embodiments operate. Within system 10 are shown two base stations BST1 and BST2. Each base station BST1 and BST2 includes a respective set of antennas $AT1_1$ through $AT1_n$ and $AT2_1$ through $AT2_n$ through which each may transmit or receive CDMA signals. The general area of intended reach of each base station defines a corresponding cell; thus, base station BST1 is intended to generally communicate with cellular devices within Cell 1 while base station BST2 is intended to generally communicate with cellular devices within Cell 2. Of course, some overlap between the communication reach of Cells 1 and 2 exists by design to support continuous communications should a communication station move from one cell to the other. Indeed, further in this regard, system 10 also includes a user station UST, which is shown in connection with a vehicle V to demonstrate that user station UST is mobile. In addition, by way of example user station UST includes a single antenna ATU for both transmitting and receiving cellular communications.

In some respects, system 10 may operate according to known general techniques for various types of cellular or other spread spectrum communications, including CDMA communications. Such general techniques are known in the art and include the commencement of a call from user station UST and the handling of that call by either or both of base stations BST1 and BST2. In order for either base station BST1 or BST2 to handle such a call, various signal processing is involved as is known in the art. For example, user station UST communicates a CDMA signal to a base station, where that CDMA communication is modulated using a spreading code that consists of a series of binary pulses, and each piece of CDMA signal transmitted according to this code is said to be a "chip." Also in this example, the devices in system 10 operate according to a given protocol for system 10, such as by way of example may be the IS-2000 standard which communicates at a 1.2288 MHz chip rate and whereby user station UST communicates at such a rate to base stations BST1 and BST2.

As discussed above in the Background Of The Invention section of this document, CDMA signals also include various levels of encoding. As a result, each base station BST1 and BST2 includes sufficient transmit circuitry to transmit signals to other stations where these signals include various levels of encoding, and similarly each base station BST1 and BST2 includes sufficient receive circuitry to remove the effects of this encoding (i.e., decode the signal) from signals received from another station so as to properly identify the data symbols within the communication. Also as introduced earlier, these codes include a long code and a short code, both of which are mentioned here as having relevance to the preferred embodiment. With respect to the short and long codes, the IS-2000 standard (as well as the previous I-95 standard) establishes an initial start time for the short and long codes commencing on what is referred to as the System Time origin, Jan. 6, 1980. The short code, which is $2^{15}$ chips long, and the long code, which is $2^{42}-1$ bits long, are considered to have originated at the System Time origin, and repeat periodically from that time. Each code is determined by using a count of the same chip length, where the count at any given time provides an offset index to the corresponding code at that time. Thus, the long code count is $2^{42}-1$ bits and that count an any time provides an offset index to determine the appropriate $2^{42}-1$ long code to be used at that time, and similarly the short code count is $2^{15}$ bits that likewise provide an offset index to a corresponding short code based on the value of the short code count at a given time. In all events, to perform various transmission operations at a time $T_P$ and with respect to the short code and long code, then each base station must determine where $T_P$ falls in time relative to repeating periods for the long and short code counts. The following additional details pertaining to the preferred embodiments are directed specifically at providing a system including enhanced aspects in this regard.

Figure 2:
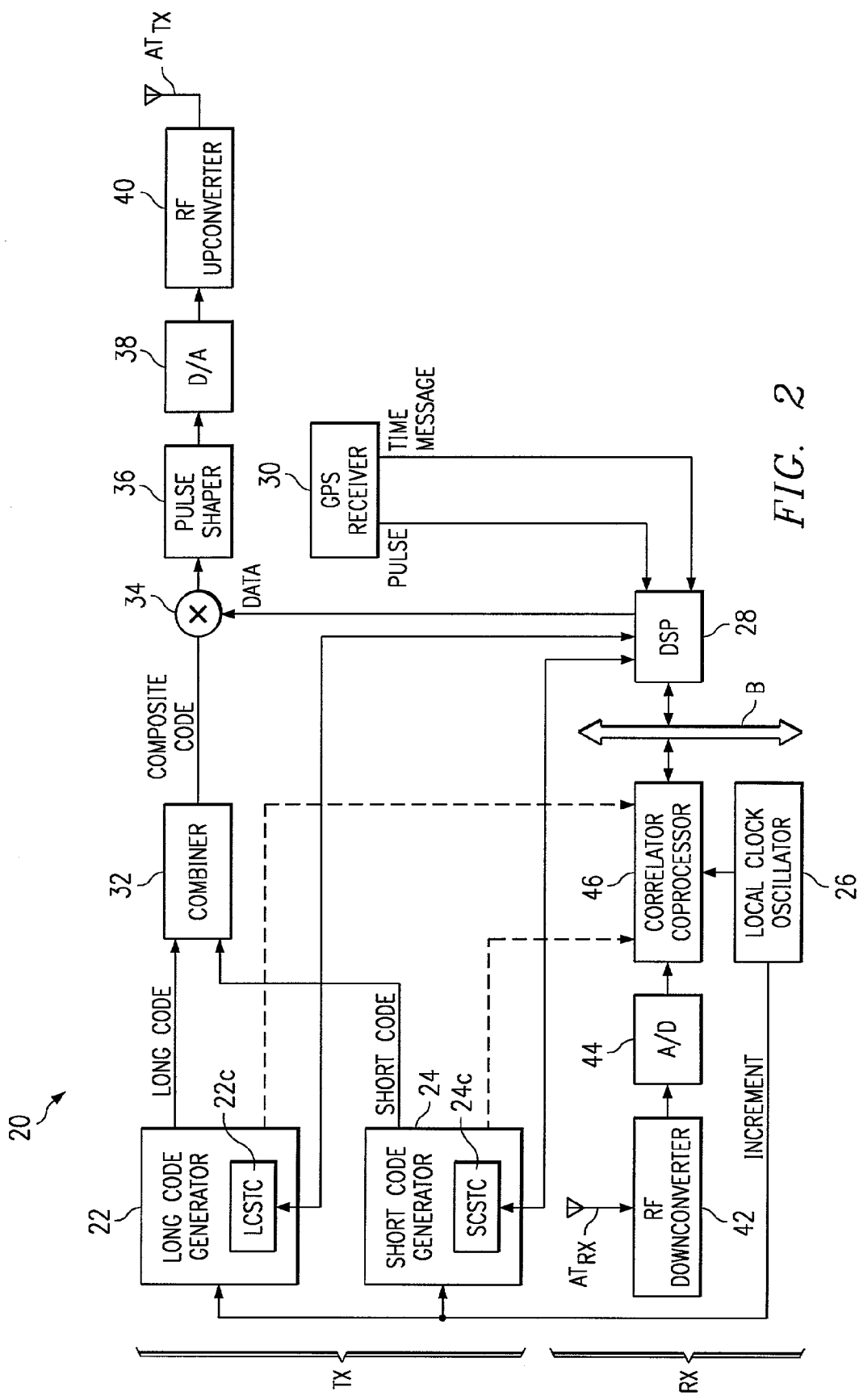
FIG. 2 illustrates an electrical block diagram of a base station configuration in accordance with the preferred embodiment and which may be used within either of base stations BST1 and BST2 in FIG. 1.

FIG. 2 illustrates an electrical block diagram of a base station configuration 20 in accordance with the preferred embodiment and which may be used within either or both of base stations BST1 and BST2 in system 10. By way of introduction, the illustration of receiver 20 only depicts various blocks to demonstrate the context and preferred implementation of one embodiment, while one skilled in the art should understand that numerous other blocks and related functionality may be included within base station configuration 20. Generally, base station configuration 20 includes one functional section illustrating transmit functionality TX and another functional section illustrating receive functionality RX, but one skilled in the art should appreciate that FIG. 2 is primarily a functional block diagram and, thus, some circuits to implement certain functions may be common to both the TX and RX functionalities. Further in this regard, the discussion herein only notes certain preferred circuits and techniques for implementing certain aspects of the preferred embodiment, while still other aspects may be implemented within base station configuration 20.

Looking to the transmit functionality section TX of base station configuration 20, it includes a long code generator 22 which includes a long code System Time count ("LCSTC") counter 22c, and section TX also includes a short code generator 24 which includes a short code System Time ("SCSTC") counter 24c. As suggested by their names, long code generator 22 outputs the long code and short code generator 24 outputs the short code. Further, both long code generator 22 and short code generator 24 are connected to operate in response to a local clock oscillator 26 in that the respective counters are generally incremented by the clock signal, and although not exhaustively shown local clock oscillator 26 also provides a master clock signal to much of the circuitry of base station configuration 20. Returning to long code generator 22 and short code generator 24, the codes generated by these circuits also may be affected in response to signals from a digital signal processor ("DSP") 28. Also with respect to DSP 28 and its potential effect on the long and short codes, DSP 28 receives a pulse and time message from a global position satellite ("GPS") receiver 30, where GPS receiver 30 is commercially available in various forms and its output and interaction with other circuits are further detailed below. DSP 28 is also bi-directionally connected to long code generator 22 and short code generator 24 so that it may read and modify the values of LCSTC counter 22c and SCSTC counter 24c during an analysis based on successive periodic values in those counters as also detailed later. In the preferred embodiment, DSP 28 is selected from the family of DSP devices commercially available from Texas Instruments Incorporated, with the preferred selection currently being the TMS340C642x DSP. The code outputs of long code generator 22 and short code generator 24 are connected as an input to a combiner 32. The output of combiner 32 provides a composite code that is connected as a multiplicand input to a multiplier 34, where multiplier 34 also receives DATA from DSP 28 as a multiplicand input. The output of multiplier 34 is connected as an input to a pulse shaper 36, and the output of pulse shaper 36 is connected as a digital input to digital-to-analog ("D/A") converter 38. Finally, the analog output of D/A converter 38 is connected to an RF upconverter circuit 40 that couples its RF output to a transmit antenna $AT_{TX}$. Although only one transmit antenna $AT_{TX}$ is shown, it should be understood and as mentioned above with respect to FIG. 1 that a base station, and hence base station configuration 20, may include multiple transmit antennas.

The operation of the transmit functionality section TX of base station configuration 20 is now described generally, with greater details presented later with respect to certain aspects of the preferred embodiment. Preferably, local clock oscillator 26 provides a free running clock signal, that is, it is not driven by or locked to any external source. This free running clock signal is connected to long code generator 22 and short code generator 24 (as well as to other circuits neither shown nor discussed). In response to the clock signal and also subject to modifications from DSP 28 as detailed later, long code generator 22 outputs a long code which is selected according to the count in LCSTC counter 22c and short code generator 24 outputs a short code which is selected according to the count in SCSTC counter 24c. Combiner 32 combines the long and short codes according to principles known in the art, and the product is the composite code connected as a multiplicand to multiplier 34. Additionally, DSP 28 outputs digital DATA to be transmitted to another station, and multiplier 34 multiplies that DATA by the composite code with the result being provided to pulse shaper 36. Phase shaper 36 converts the digital signal to any one of various desired transmission formats as known in the art, such as a raised cosine signal. Finally and as known in the art, D/A converter 36 converts the formatted digital signal to an analog form and radio frequency upconverter 40 converts the analog signal into a radio frequency format that is then transmitted via transmit antenna $AT_{TX}$ so that those radio frequency communications may be received by other stations such as user station UST shown in FIG. 1.

Looking to the receive functionality section RX of base station configuration 20, it includes a receive antenna $AT_{RX}$, although it should be understood and as mentioned above with respect to FIG. 1 that a base station, and hence base station configuration 20, may include multiple receive antennas. Receive antenna $AT_{RX}$ receives signals and connects them to an input of an RF downconverter 42. The analog output of RF downconverter 42 is connected as an input to an analog-to-digital ("A/D") converter 44 that has its output connected as an input to a correlator coprocessor 46. Preferably, correlator coprocessor 46 is constructed as an application specific integrated circuit ("ASIC"), and correlator coprocessor 46 operates in cycles generally in response to the master clock signal provided by local clock oscillator 26. Additionally and for reasons detailed later, separate outputs are shown with dotted lines connected from code generators 22 and 24 to correlator coprocessor 46 because it operates in response to the counts in counters 22c and 24c, but in a manner different than the transmit functionality section TX of configuration 20. Correlator coprocessor 46 is bi-directionally coupled to a bus B that is also bi-directionally coupled to DSP 28.

The operation of the receive functionality section RX of base station configuration 20 is now described generally, with greater details presented later with respect to certain aspects of the preferred embodiment. Radio frequency signals are received by receive antenna $AT_{RX}$, downconverted by downconverter 42, and converted from analog to digital signals by A/D converter 44, all as known in the art. The digital resulting signals are passed to correlator coprocessor 46 which may include various sub-circuits to achieve numerous functional operations. Particularly, in the preferred embodiment, correlator coprocessor 46 is a programmable, highly flexible, vector-based correlation machine that preforms CDMA base-station RAKE receiver operations for multiple channels. Because most RAKE receiver functions involve correlations and accumulations, regardless of the particular wireless protocol, a generic correlation machine can be used for various RAKE receiver tasks like finger despreading (complex values) which consist of PN-multiply and coherent accumulation, and additionally correlator coprocessor 46 performs CMDA search operations. In addition, correlator coprocessor 46 also accumulates symbol energy values; for example, it accumulates the early, on-time, and late samples of a RAKE finger, where these measurements are used for the finger's code-tracking loop and where for search operations correlator coprocessor 46 returns the accumulated energy values for a specified windows of offsets. Additional details with respect to the functionality of correlator coprocessor 46 may be found in the following U.S. patent applications, each of which is hereby incorporated herein by reference: (1) U.S. patent application Ser. No. 09/244,518, filed Feb. 4, 1999; (2) U.S. patent application Ser. No. 09/607,410, filed Jun. 30, 2000; and (3) U.S. patent application Ser. No. 09/691,576, filed Oct. 18, 2000. The results of processing operations from correlator coprocessor 46 are coupled to bus B, and using those results DSP 28 performs additional signal processing. For example, DSP 28 preferably performs symbol rate receive operations such as channel estimation, maximal ratio combining ("MRC"), de-interleaving, automatic gain control and automatic frequency control. Thus, DSP 28 is able to ultimately detect the received data symbols, and those symbols may be processed in various desirable manners based on the intended functionality of base station configuration 20; indeed, typically those symbols provoke additional transmissions in the form of DATA output by DSP 28 to multiplier 34 as discussed above with respect to the transmit functionality section TX of base station configuration 20.

Figure 3:
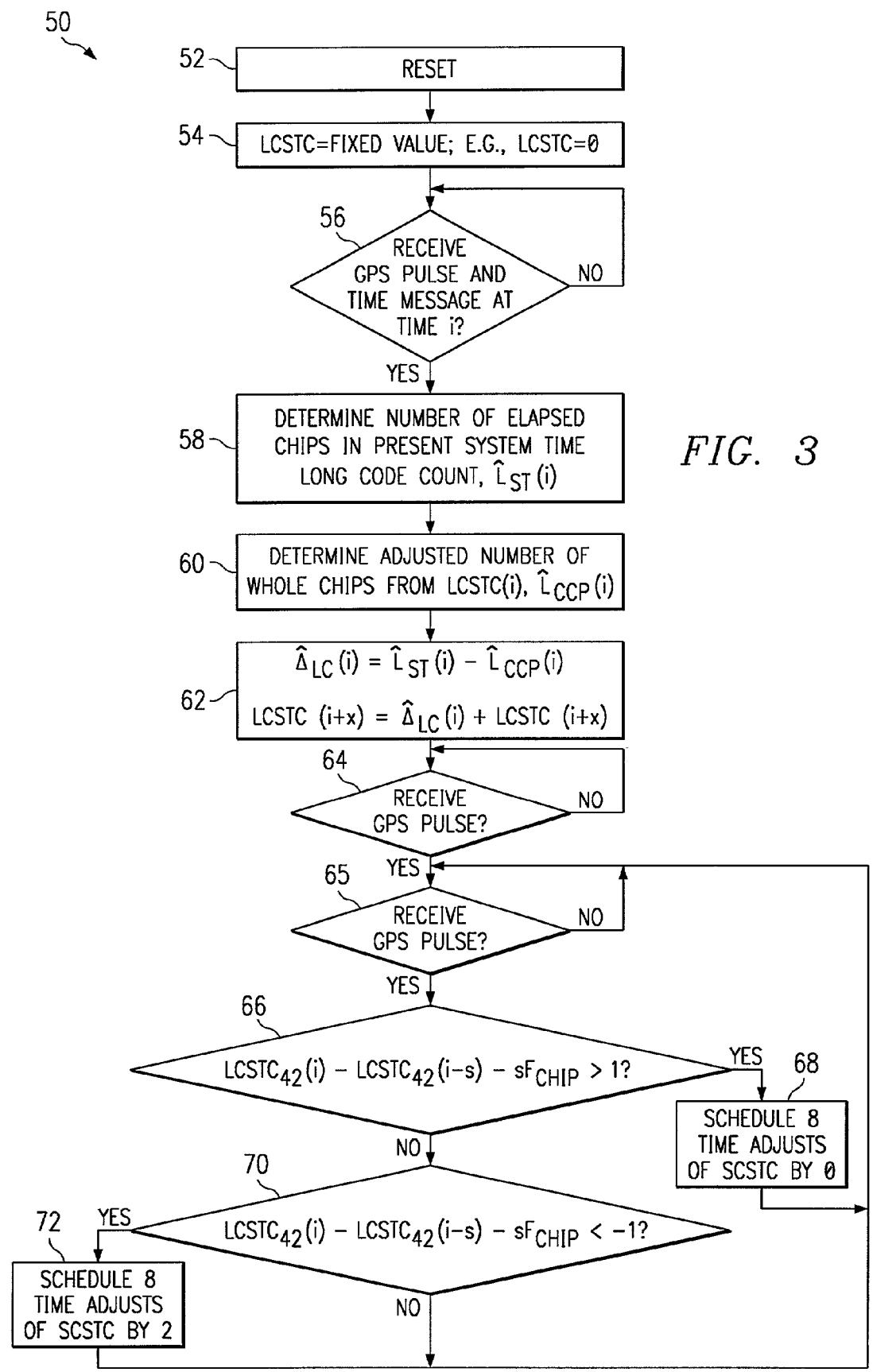
FIG. 3 illustrates a flowchart of a method of preferred operation of various blocks of base station configuration 20 of FIG. 2.

FIG. 3 illustrates a flowchart of a method 50 of preferred operation of various blocks of base station configuration 20, where according to method 50 the counts in the LCSTC counter 22c and SCSTC counter 24c are established and updated so that the long and short codes, respectively, may be provided in response to the counts. By way of introduction and to simplify the following discussion, the specific steps illustrated in method 50 are directed to LCSTC counter 22c and its related long code, while one skilled in the art will appreciate from the discussion how a comparable method is applied to SCSTC counter 24c and its related short code. Method 50 commences with a reset step 52 that occurs when base station configuration 20 is reset, such as at start-up or a comparable event. Following reset step 52, method 50 continues to step 54. In step 54, LCSTC counter 22c is set to a predetermined initial value to establish an initial local time. In the preferred embodiment, the predetermined value is zero. Thereafter, method 50 continues from step 54 to step 56, and note that during the remaining steps the value in LCSTC counter 22c increments in response to local clock oscillator 26 (unless other intervention occurs as discussed later).

In step 56, GPS receiver 30 of base station configuration 22 awaits a GPS pulse and its corresponding time message. Recall as discussed in the Background Of The Invention section that the GPS system is known to issue a periodic pulse along with a time message according to an atomic clock. While the pulse may be issued by the GPS every one second, in the preferred embodiment step 56 may be established to respond to each such pulse or, alternatively, step 56 may be such that it responds only to pulses spaced apart at some other fixed period (e.g., two seconds). In any event, step 56 represents a wait state until a pulse at the established period and its corresponding time message are received. When they are received, preferably an interrupt is generated to DSP 28 which reads the time message into DSP memory and stores along with it the number of counts in LCSTC counter 22c as of the time that the time message was received. Next, method 50 continues from step 56 to step 58. Also, for sake of reference in this document, let the index for each received pulse be i and, thus, a time message received at time i along with pulse(i) may be referenced as time message(i).

Figure 4:
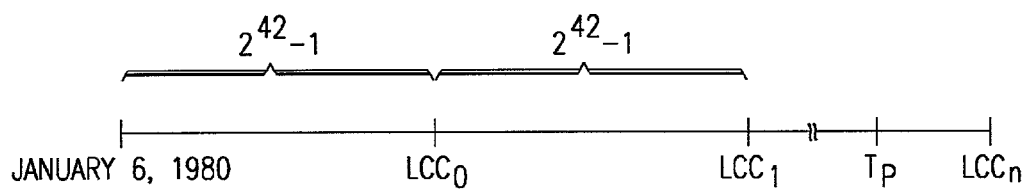
FIG. 4 which illustrates a general timing diagram commencing at the System Time origin (i.e., Jan. 6, 1980) and with long code counts $LCC_0$ through $LCC_n$ and a sample $T_P$ taken during $LCC_n$.

Step 58 and subsequent steps are now introduced with reference to FIG. 4 which illustrates a general timing diagram commencing at the System Time origin (i.e., Jan. 6, 1980). Starting at the System Time origin, a first long code count $LCC_0$ occurs and upon its completion it is followed by another like-period long count, and so forth whereby the counts repeat to create a succession of long code counts $LCC_0$, $LCC_1$ through $LCC_n$ where each long code count has a period equal to $2^{24}-1$ bits during which the count proceeds from a value of 0 to a value of $2^{24}-1$. By way of example in the preferred embodiment where the chip rate is 1.2288 MHz, then each long code count is approximately 3,579,139 seconds or approximately 41.425 days long. In order to properly synchronize base station configuration 20, method 50, and more particularly steps 58 through 62 as now discussed in greater detail, endeavor to receive a pulse at a time $T_P$ and to determine from that pulse's arrival time and the pulse's corresponding time message what the System Time long code count and short code count are at $T_P$, that is, what are these count values in the time domain defined relative to the System Time origin. Thus, in the example of FIG. 4, method 50 seeks to determine the number of counts in the long code count, in chips, at time $T_P$. Additionally, once this count is determined, method 50 re-initializes the value of LCSTC counter 22c to an adjusted estimate of the determined count so that the local time in LCSTC counter 22c thereafter represents an estimate of the actual System Time. Thereafter, LCSTC 22c counter is incremented forward after $T_P$ according to this re-initialized value.

Returning to FIG. 3 and looking specifically to step 58, it determines the number of chips that have elapsed during the System Time long code count as of the time the present GPS pulse was received. By way of example, such a determination may be thought of being made in response to receiving a pulse(i) and its corresponding time message(i) which arrived at base station configuration 20 at time $T_P$ illustrated in FIG. 4. Specifically, in step 58, DSP 28 determines an estimated value of the System Time long code count at time i, where this estimate is designated $\hat{L}_{ST}$ and is determined according to the following Equation 1:

$$\hat{L}_{ST}(i) = i \times F_{chip} - (2^{42} - 1) \times \text{round}\left[\frac{i \times F_{chip}}{2^{42} - 1}\right] \quad \text{Equation 1}$$

where, $F_{chip}$ is the chip rate for the particular embodiment, such as 1.2288 MHz in the preferred example, and the "round" designation indicates that the result returned from $$\left[\frac{i \times F_{chip}}{2^{42} - 1}\right]$$

is rounded up or down to the nearest integer. From the preceding, one skilled in the art will appreciate that Equation 1 determines for base station configuration 20 an approximate value of the System Time long code count at a time $T_P$ illustrated in FIG. 4.

Given the estimate of the System Time long code count from Equation 1, method 50 continues from step 58 to step 60 in which DSP 28 operates to determine an adjusted number of local long code counts equal to the number of local counts in LCSTC counter 22c at the time i that the step 56 GPS pulse was received. In other words, recall that step 54 reset LCSTC counter 22c to a predetermined initial local value that has continuously incremented since that time; accordingly, as of time i when the step 54 GPS pulse was received, the value in LCSTC counter 22c is larger than the step 54 value, and that local value will differ from the System Time long code count by a difference depending on when time i occurred. To achieve the step 60 approximation, rather than simply using the local count value of LCSTC counter 22c as of time i for later determinations, two additional aspects are accommodated, each of which is detailed below.

As a first aspect relating to the counts in LCSTC counter 22c, the bit precision in LCSTC and SCSTC counters 22c and 24c is considered. Specifically, in the preferred embodiment, LCSTC and SCSTC counters 22c and 24c count in $\frac{1}{8}^{th}$ chip increments. With respect to LCSTC counter 22c, it accomplishes this using a 45 bit counter for the $2^{42}-1$ bit long code; thus, the 42 most significant counter bits identify an integer number of chips while the three least significant counter bits count in $\frac{1}{8}^{th}$ chip increments. With respect to SCSTC counter 24c, it preferably is sized to count a duration long enough to include three short code periods and also to increment in $1/8^{th}$ chip increments. Thus, SCSTC counter 24*c* includes 15 bits to count a single $2^{15}$ bit short code, two additional bits to span a total of at least three short code periods, and three additional bits to count in $1/8^{th}$ chip increments, thus totaling 20 bits. In all events, given the $1/8^{th}$ chip increment of counters 22*c* and 24*c*, the preferred embodiment as detailed below in connection with Equation 2 adapts the values of these counts so that the adapted value provides a comparable unit to the units of whole chips realized by Equation 1.

Figure 5:
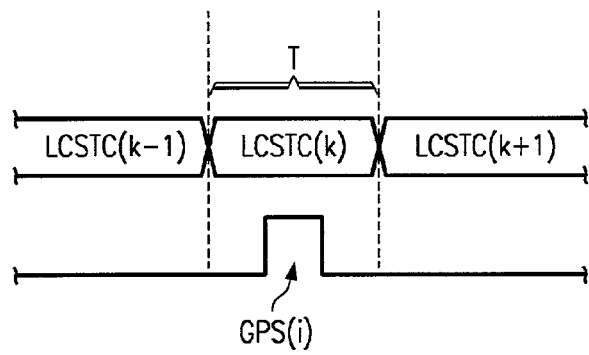
FIG. 5 illustrates a sampling error possibility arising from the specific arrival time of a GPS pulse and with respect to the count in the preferred embodiment LCSTC counter.

As a second aspect relating to the counts in LCSTC counter 22*c*, note that there is some level of sampling error of the count in either LCSTC counter 22*c* or SCSTC counter 24*c*. FIG. 5 illustrates this sampling error possibility arising from the specific arrival time of a GPS pulse and with respect to LCSTC counter 22*c*, with the same principles applying equally to SCSTC counter 24*c*. Particularly, FIG. 5 illustrates a GPS pulse GPS(i) occurring during a period T in which LCSTC counter 22*c* has a certain count, where that count is indicated at LCSTC(k). Note, however, that GPS(i) could shift in time anywhere within T and, any GPS pulse occurring during the $1/8^{th}$ chip period of T and following an increment in the value of LCSTC counter 22*c* will have the same value that was valid at the beginning of the interval T. In order to minimize this sampling error, the preferred embodiment as also detailed below in connection with Equation 2 adapts the in fact actual stored value of LCSTC counter 22*c* to point to the center of interval T.

Given the two above-described aspects relating to the counts in a counter 22*c* or 24*c*, step 60 determines an estimated approximate value of the long code count corresponding to the count in LCSTC counter 22*c* as of the arrival of the pulse GPS(i), where the estimated value is designated as $\hat{L}_{CCP}(i)$ and is shown in the following Equation 2:

$$\hat{L}_{CCP}(i)=(LCSTC(i)+0.5)/8 \qquad \text{Equation 2}$$

Thus, the denominator from Equation 2 implements the above-discussed adaptation from $1/8^{th}$ chip units to whole-chip based units, while the addition of 0.5 to the then-present value of the count in LCSTC counter 22*c* provides a non-biased estimator that centers the sampling time in the interval T shown in FIG. 5.

Following step 60, method 50 continues to step 62 which determines the difference in the values determined in steps 58 and 60, that is, in step 62 DSP 28 determines a long code count difference, designated as $\hat{\Delta}_{LC}(i)$, and according to the following Equation 3:

$$\hat{\Delta}_{LC}(i)=\hat{L}_{ST}(i)-\hat{L}_{CCP}(i) \qquad \text{Equation 3}$$

Also in this regard, if the value of $\hat{\Delta}_{LC}(i)$ as determined by Equation 3 is not an integer, it is rounded to the nearest $1/8^{th}$ fraction of a chip. From Equation 3 and the preceding, one skilled in the art should recognize that $\hat{\Delta}_{LC}(i)$ therefore represents an estimate of the offset between the Equation 1 estimated System Time long code count and the estimated number of chips counted in LCSTC counter 22*c* at time i. Having determined this estimated offset, in step 62 and at some time (i+x) DSP 28 adds this value of $\hat{\Delta}_{LC}(i)$ (as rounded to a $1/8^{th}$ chip value) into LCSTC counter 22*c* for time i, that is, the previous local value in LCSTC counter 22*c* is adjusted so that after step 62 LCSTC(i+x)= $\hat{\Delta}_{LC}(i)$+LCSTC(i+x). At this point, therefore, the value in LCSTC counter 22*c* should represent an estimate of the System Time long code chip count. In addition, this newly-written value of LCSTC(i) is stored in DSP 28 memory as corresponding to time message(i). Thereafter, the newly-written value of LCSTC counter 22*c* is continuously incremented by the free-running local clock oscillator 26, subject to periodic adjustments as further detailed with the remaining steps of method 50 discussed below.

After step 62, method 50 continues to step 64. By way of introduction, step 64 along with the remaining steps 65 through 72 represent a timing maintenance and correction methodology for the count in LCSTC counter 22*c* as determined in response to subsequently received GPS pulses and their corresponding time messages. Specifically, steps 64 and 65 operate in a manner comparable to step 56, that is, in steps 64 GPS receiver 30 of base station 22 again await respective GPS pulses and their corresponding time messages. When each is received, preferably an interrupt is generated to DSP 28 which reads the values of the time message into DSP memory and stores along with it the count in LCSTC counter 22*c* as of the time of receipt of this more-recently received pulse. At the conclusion of step 65, therefore, DSP 28 memory stores at least two time messages after time i, such as at time i+2 and time i+4. Thereafter, method 50 continues from step 64 to step 66.

Step 66 makes a determination based on the recognition of the preferred embodiment that for two GPS pulses received a total of s seconds apart, the difference between the number of chip counts stored in LCSTC counter 22*c* at the beginning and end of the s seconds should be s×$F_{chip}$ assuming no error or drift in the number of counts. For example, if s equals 2 and the chip rate is 1.2288 MHz, then LCSTC(i+4) should be 2×1.2288(10)$^6$ greater than LCSTC (i+2). Given these observations, step 66 determines whether the following Equation 4 is satisfied:

$$LCSTC_{42}(t+s)-LCSTC_{42}(t)-(s\times F_{chip})>1 \qquad \text{Equation 4}$$

where the subscript "42" with reference to each value $LCSTC_{42}$ in Equation 4 indicates that only the 42 most significant bits from the counter are used, thereby making the determination in whole chip units (as opposed to $1/8^{th}$ increments if all 45 bits of the counter were used). If Equation 4 is satisfied then method 50 continues from step 66 to step 68, whereas if Equation 4 is not satisfied, then method 50 continues from step 66 to step 70.

From the above, step 68 is reached when the difference determined by Equation 4 exceeds one, where such a result indicates that the count in LCSTC counter 22*c* at time i+s has drifted upward to be larger and inaccurate as compared to the value it should have counted had it counted only s×$F_{chip}$ chips since time t. As a result, step 68 operates to reduce the count in LCSTC counter 22*c* to what is perceived to be an accurate count based on s×$F_{chip}$ chips having elapsed since time t. In the preferred embodiment, this operation is achieved by DSP 28 scheduling eight $1/8^{th}$ chip time adjustments to be made to the count in LCSTC counter 22*c*, where in order to comply with guidelines of the standard each of these $1/8^{th}$ chip adjustments is to be made no sooner than 200 msec apart. In order to actually accomplish these eight scheduled adjustments, in the preferred embodiment long code generator 22 receives a timing adjustment indication from DSP 28 and which solely for illustrative purposes is shown as a timing adjustment functional block later in FIG. 6, where the timing adjustment functional block alters the increment effect of the clock signal between local clock oscillator 26 and LCSTC counter 22*c*. In response to the scheduling of step 68, for one clock transition from local dock oscillator 26 during a 200 msec period, the timing adjustment functional block prevents or suppresses the clock signal transition from incrementing the count in LCSTC counter 22*c*. As a result, over eight 200 msec periods, then there are eight instances where the count in LCSTC counter 22c is not incremented, thereby leaving the total count to be one chip less (i.e., 8 instances * $\frac{1}{8}^{th}$ chip increment suppressed) than it would have been without the intervention by the timing adjustment functional block. Following step 68, method 50 returns to step 65 where after a successively-received GPS pulse arrives step 66 makes its determination, with a possible continuation of flow back to step 68 as already described or to step 70 where the latter is further discussed below.

Step 70 also makes a determination based on the recognition of the preferred embodiment that for two GPS pulses received a total of s seconds apart, the difference between the number of chip counts stored at that time in LCSTC counter 22c should be $s \times F_{chip}$ chips assuming no error or drift in the number of counts. However, in contrast to step 66 which is directed to an undesirable acceleration in the count of LCSTC counter 22c, step 70 is directed to the possibility of an undesirable slowdown in the count of LCSTC counter 22c. Specifically, step 70 determines whether the following Equation 5 is satisfied which occurs if the count in LCSTC counter 22c has drifted downward to be less than it should be had it counted $s \times F_{chip}$ chips since time t:

$$LCSTC_{42}(t+s) - LCSTC_{42}(t) - (s \times Fchip) < 1 \qquad \text{Equation 5}$$

If Equation 5 is satisfied then method 50 continues from step 70 to step 72, whereas if Equation 5 is not satisfied, then method 50 returns from step 70 to step 65.

From the above, step 72 is reached when Equation 5 is true, such a result indicates that the count in LCSTC counter 22c at time t+s is inaccurate in that it is less than it should be had LCSTC counter 22c counted $s \times F_{chip}$ chips since time t. As a result, step 72 operates to increase the count in LCSTC counter 22c to what is perceived to be an accurate count based on $s \times F_{chip}$ chips having elapsed since time t. In the preferred embodiment, this operation also is achieved by DSP 28 scheduling eight $\frac{1}{8}^{th}$ chip time adjustments to be made to the count in LCSTC counter 22c, again complying with guidelines of the standard so that each of these adjustments is be made no sooner than 200 msec apart. In this case, the timing adjustment functional block of long code generator 22 operates in a multiplying effect rather than a suppressive. Specifically, in response to the scheduling of step 72, for one clock transition from local clock oscillator 26 during a 200 msec period, the timing adjustment functional block doubles the incrementing of the count in LCSTC counter 22c, that is, instead of a single increment of the count in response to a single clock transition, a double increment occurs in response to a single dock transition, thereby advancing the count by $\frac{2}{8}^{th}$ chips. As a result, over eight 200 msec periods, then there are eight instances where the count in LCSTC counter 22c is twice incremented, thereby advancing the total count to be one chip more (i.e., 8 instances * $\frac{2}{8}^{th}$ chips) than it would have been without the intervention by the timing adjustment functional block. Following step 72, method 50 returns to step 65 whereby after a successively-received GPS pulse arrives step 66 makes its determination, with the various possible continuations of flow as discussed above. Also, the return and forward method flow involving steps 65 through 72 preferably repeats periodically for some time, each time detecting whether a drift has occurred in LCSTC counter 22c and scheduling and performing any required corrections if such a drift is detected. Lastly, one skilled in the art should appreciate that if the condition of neither step 66 nor step 70 is satisfied for a given iteration of the flow, then no intervention is made by the timing adjustment functional block and, as a result, for each period of local clock oscillator 26, LCSTC counter 22c is incremented by a corresponding single $\frac{1}{8}^{th}$ chip count.

Having described method 50 with respect to LCSTC counter 22c, various additional observations are noteworthy. As a first observation and as briefly mentioned above, method 50 also is preferably applied to SCSTC counter 24c. Without re-stating the entire method in detail, one skilled in the art should therefore appreciate that SCSTC counter 24c is reset to a predetermined value, incremented thereafter in response to transitions from local clock oscillator 26, and further modified to include an offset value so that thereafter SCSTC counter 24c advances according to an estimated System Time short code count. Thereafter, periodic evaluations are made in response to successively received GPS pulses to ascertain the existence of any inaccurate increase or decrease in the count of SCSTC counter 24c as detected by comparing the count in the counter at a pulse time to its value as stored at the time of a previously-received pulse. If an erroneously high count is found, a timing adjustment functional operation by DSP 28 operates to suppress the $\frac{1}{8}^{th}$ chip incrementing of SCSTC counter 24c for eight instances, each occurring no sooner than 200 msec apart, whereas if an erroneously high count is found, a timing adjustment operation provided by DSP 28 operates to double the $\frac{1}{8}^{th}$ chip incrementing of SCSTC counter 24c for eight instances, each occurring no sooner than 200 msec apart. As a second observation, in the preferred embodiment steps 65 through 72 need not be activated for every received GPS pulse when such pulses are on the order of two or less seconds apart. Instead, in the preferred embodiment the evaluation and possible correction is preferably made every 30 seconds. In addition, if a determination is made that a correction (i.e., increase or decrease) is required of the count in either LCSTC counter 22c or SCSTC counter 24c, then the time of the actual correction need not be immediate or even precisely timed because the short-term stability of local clock oscillator 26 is sufficiently high and, thus, confidence in the correction determinations should remain valid over several milliseconds. However, if a correction is delayed, then the next evaluation and determination likewise should be delayed until the previously-delayed correction is implemented by adjusting the counts in the appropriate counter.

Figure 6:
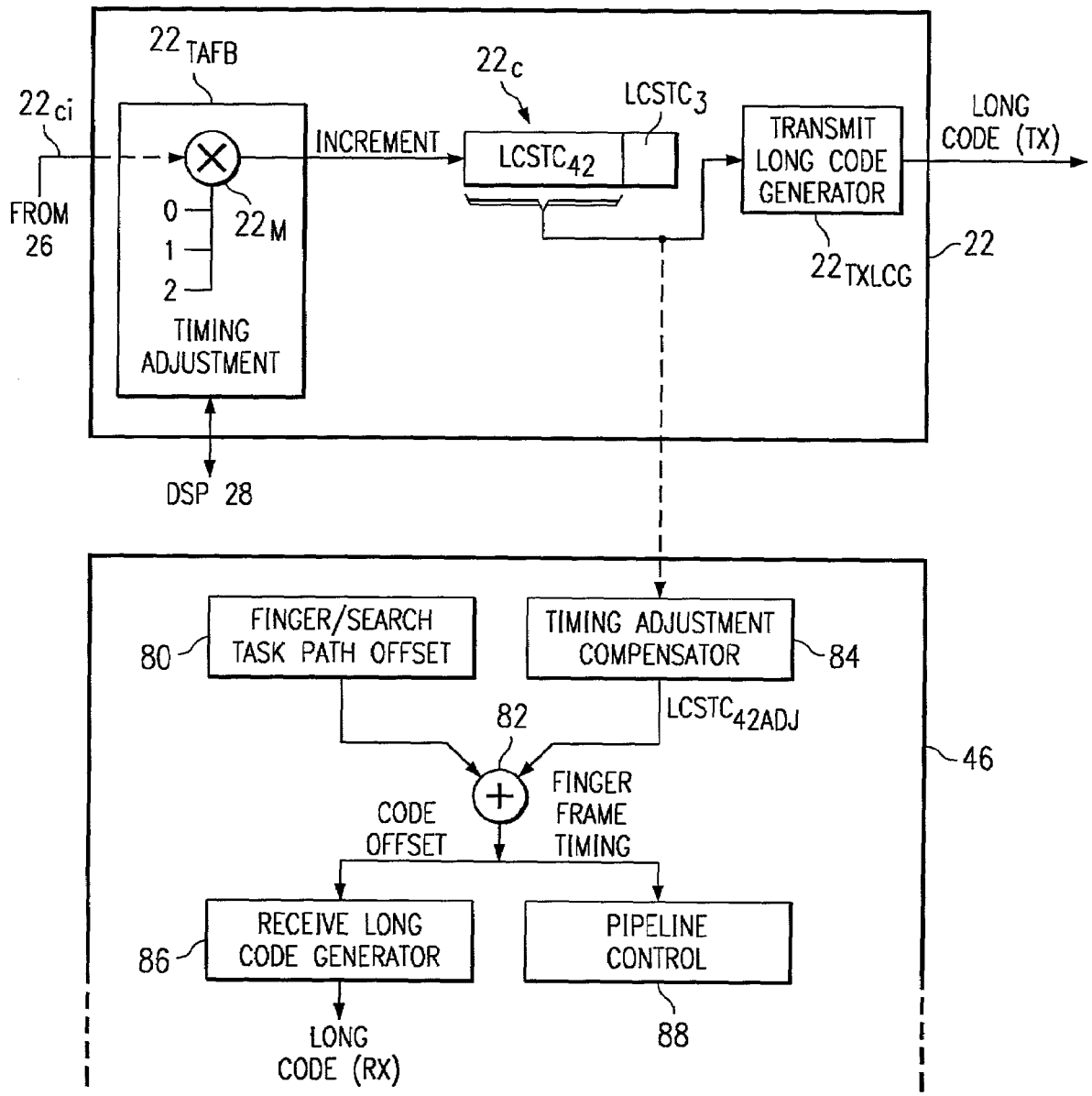
FIG. 6 illustrates additional details pertaining to the long code generator and correlator coprocessor of FIG. 2 with particular focus on the long code as used in both the transmit functionality TX section and the receive functionality RX section.

Having detailed the preferred embodiment with respect to developing the long code count for base station configuration 20, the reader is now reminded that in FIG. 2 it was shown that the long code is output in the transmit functionality section TX and also was shown connected using a dashed line to the receive functionality section RX. FIG. 6 now illustrates these aspects in greater detail and which should be more readily appreciated given an understanding of the preceding Figures and the descriptions thereof. In general, FIG. 6 illustrates additional details pertaining to long code generator 22 and correlator coprocessor 46 with particular focus on the long code as used in both the transmit functionality section TX and the receive functionality section RX. Additionally, one skilled in the art should appreciate that comparable aspects also apply to the short code, but such are not shown so as to simplify the illustration and the following discussion.

Looking to long code generator 22 in FIG. 6, it includes a clock input $22_{ci}$ connected to receive the clock signal from local clock oscillator 26 (see also, FIG. 2) and input $22_{ci}$ is logically shown to provide this clock signal to a timing adjustment functional block $22_{TAFB}$; preferably, timing adjustment functional block $22_{TAFB}$ is a function provided in software by DSP 28 and provides the functionality described in connection with steps 66 through 72 of FIG. 3, but it is described as a block in this document to facilitate an understanding of its operation with respect to the other blocks shown in FIG. 6 (and FIG. 2). The output of timing adjustment functional block $22_{TAFB}$ provides an INCREMENT signal to LCSTC counter 22c, where the most significant 42 bits, $LCSTC_{42}$, are shown separate from the least significant 3 bits, $LCSTC_3$, of that counter in FIG. 6 so as to distinguish the whole chip count versus the $⅛^{th}$ chip count, respectively. The most significant 42 bits, $LCSTC_{42}$, are connected as an input to a transmit long code generator $22_{TXLCG}$ that provides as its output the long code to be used by the transmit functionality section TX shown in FIG. 2.

The operation of long code generator 22 should be readily appreciated given the various earlier Figures and descriptions thereof and, thus, such operation is only briefly reiterated here with respect to the specific illustration of FIG. 6. The clock signal from clock input $22_{ci}$ is received by timing adjustment functional block $22_{TAFB}$ which may operate to pass that signal unaffected to increment LCSTC counter 22c or may modify it as described in connection with either step 68 or 72 in FIG. 3. To further illustrate these contingencies, timing adjustment functional block $22_{TAFB}$ is functionally shown to include a frequency multiplier $22_M$ which receives the clock signal as one multiplicand and which may receive either a value of 0, 1, or 2 as another multiplicand. To achieve step 68, which recall was described as suppressing the clock signal from reaching LCSTC counter 22c, then a multiplicand of 0 is provided, thereby outputting a zero output (i.e., no clock) at that time. Conversely, to achieve step 72, which recall was described as doubling the clock signal transitions to LCSTC counter 22c, then a multiplicand of 2 is provided, thereby outputting duplicate clock transitions at that time. Lastly, the default multiplicand is the value of 1, which results in no change in the clock signal so that it passes from clock input $22_{ci}$ directly to increment LCSTC counter 22c. Completing the operation of long code generator 22, $LCSTC_{42}$ provides an offset index to transmit long code generator $22_{TXLCG}$. In response, transmit long code generator $22_{TXLCG}$ operates according to known principles to generate and output the long code, and the long code is then presented to the appropriate devices along the transmit functionality section TX of the base station. In response, each increment of $LCSTC_{42}$ drives a new DATA read and a composite code generation so that the product of these values may be provided by multiplier 34 (FIG. 2) and processed for transmission.

Turning now to those aspects of correlator coprocessor 46 as shown in FIG. 6, they include a finger/search task path offset block 80 having an output connected as a first addend to an adder 82. A second addend is provided to adder 82 from a timing adjustment compensator 84. Preferably, timing adjustment compensator 84 also is a function provided in software by DSP 28, but it too is described as a block in this document to facilitate an understanding of its operation with respect to the other blocks shown in FIG. 6 (and FIG. 2). Timing adjustment compensator 84 receives as its input the 42 most significant bits $LCSTC_{42}$ from LCSTC counter 22c, and note that this connection is shown as a dotted line to correspond to the dotted line discussed above with respect to FIG. 3. Specifically, recall it was earlier noted that the dotted lines connection is depicted because correlator coprocessor 46 operates in response to the counts in counters 22c and 24c in a manner different than the transmit functionality section TX of configuration 20, and this distinction is now illustrated and further explained below. The output of adder 82 provides a code offset to a receive long code generator 86 and a finger frame timing signal to a pipeline control block 88.

The operation of the receive functionality section RX is in many respects either according to the prior art or per the operation of correlation coprocessor 46 as described in the above-incorporated patent applications, with the intended focus of the illustration in FIG. 6 for this section being directed to timing adjustment compensator 84. Specifically, as known in the art, the long code count is used to generate each finger and search task frame/slot/chip timing and also to facilitate pipeline control. However, once these various functions are initialized to the LCSTC value established in step 62 of FIG. 3, preferably the receive functionality section RX operates so that any later adjustments to LCSTC counter 22c by timing adjustment functional block $22_{TAFB}$ (i.e., per steps 68 or 72) do not affect the receive functionality section RX. In other words, after the step 62 initialization of LCSTC, in the preferred embodiment the finger tasks are synchronized by their own delay lock loop functions and are not interfered with by any internal LCSTC adjustments. To achieve this result, once these tasks are running, timing adjustment compensator 84 effectively removes the effect of any adjustment made to $LCSTC_{42}$ by timing adjustment functional block $22_{TAFB}$, and this is achieved by incrementing/decrementing the value received from $LCSTC_{42}$ if $LCSTC_{42}$ has been adjusted per step 68 or step 72. Accordingly, timing adjustment compensator 84 receives $LCSTC_{42}$ and outputs a corresponding value $LCSTC_{42ADJ}$ which is selectively modified as follows. Let c be the LCSTC increment at chip rate, that is, let it be 8 times the time for each $⅛^{th}$ bit adjustment to LCSTC counter. Accordingly, timing adjustment compensator 84 operates according to the following pseudocode:

line 1; if $LCSTC_{42}(c+1)-LCSTC_{42}(c)=0$, then $LCSTC_{42ADJ}=LCSTC_{42}+1$ line 2; if $LCSTC_{42}(c+1)-LCSTC_{42}(c)=2$, then $LCSTC_{42ADJ}=LCSC_{42}-1$ line 3; else $LCSTC_{42ADJ}=LCSTC_{42}$ Line 1 of the pseudocode is true in an instance where timing adjustment functional block $22_{TAFB}$ suppressed clock transitions from reaching LCSTC counter 22c and thereby reduced the integer chip count therein by one chip, and as a result line 1 establishes $LCST_{42ADJ}$ to be the count of $LCSTC_{42}$ prior to the suppressed clock transitions by defining $LCSTC_{42ADJ}$ to be $LCSTC_{42}+1$. Conversely, line 2 of the pseudocode is true in an instance where timing adjustment functional block $22_{TAFB}$ doubled the clock transitions to LCSTC counter 22c and thereby increased the integer chip count therein by 2, and as a result line 2 establishes $LCSTC_{42ADJ}$ to be the count of $LCSTC_{42}$ prior to the doubled clock transitions by defining $LCST_{42ADJ}$ to be $LCSTC_{42ADJ}-1$. Lastly, if neither line 1 nor line 2 is true, then line 3 makes no adjustment so that $LCSTC_{42ADJ}$ is the same as the value of $LCSTC_{42}$. In all events, therefore, following any potential compensation, $LCST_{42ADJ}$ is used as a code offset to RX long code generator 86 which may operate to select the corresponding long code using principles known in the art, and likewise $LCSTC_{42ADJ}$ is used as a finger framing signal for property timing of pipeline control block 88.

Given the preceding operations in response to the GPS system, the preferred embodiment also optionally implements additional protection should the GPS system be temporarily unavailable. Specifically, to accommodate such a contingency, base station configuration 20 should include a power source (e.g., battery) used to maintain the local time of the base station while it is shut down. At power up, LCSTC counter 22c and SCSTC counter 24c are then initialized with values derived from the current date/time provided by the internal clock. Thereafter, they are synchronized with the GPS per the above-described methodology once the GPS signals become available.

From the above, it may be appreciated that the above embodiments provide an improved transceiver configuration operating in response in part to time signals from the GPS system and preferably which is implemented as a CDMA base station. A transceiver according to the preferred embodiment does not rely on a PLL clock oscillator to update the values of its short and long code counts and, hence, the drawbacks of such an approach are avoided. For example, by avoiding the PLL clock oscillator, no phase noise is induced by the master clock signal provided by the free-running local clock oscillator 26. As another example, the expense imposed by a PLL clock oscillator as well as the noise reduction circuits required to offset the negative effects of such a device are avoided. In addition, the preferred embodiment provides still additional benefits. For example, the combination of an ASIC correlator coprocessor 46 and a DSP 28 provide an integrated and digital synchronization to GPS solution for base station implementations. As another example, such an integrated approach is attractive to vendors of such solutions as it simplifies their implementation. As still another benefit, DSP 28 preferably performs the synchronization determinations and adjustments in software, allowing high performance, high flexibility and support of various external source formats. As still another benefit, while the preferred embodiment has been illustrated in connection with certain protocols and standards, one skilled in the art may ascertain other contexts in which various of the inventive teachings may be implemented. As yet another benefit, certain of the above teaching may be varied in various respects, such as by implementing the transceiver as a user station, accommodating different standards, and so forth. Consequently, while the present embodiments have been described in detail, various substitutions, modifications or alterations could be made to the descriptions set forth above without departing from the inventive scope which is defined by the following claims.

The invention claimed is:

1. A wireless communication system, comprising:
   a transceiver, comprising:
   a code counter;
   a clock oscillator for advancing a count in the code counter;
   circuitry for receiving a time message based on a system time external from the transceiver;
   circuitry for determining a system time count and for storing the system time count to the code counter in response to the time message, wherein the code counter continues to be advanced from the system time count in response to the clock oscillator;
   circuitry for repeatedly evaluating the count in the code counter, after advancement from the system time count, to ascertain whether the count has drifted to an inaccurate count; and
   circuitry, responsive to detecting an inaccurate count, for adjusting the inaccurate count to a perceived accurate count.

2. The wireless communication system of claim 1 wherein the system time count is determined relative to a time i and wherein the transceiver further comprises:
   circuitry for initializing an initial count into the counter prior to storing the system time count to the code counter;
   circuitry for determining an estimated offset between the system time count and the count in the code counter at the time i; and
   circuitry for adding the estimated offset to the count in the code counter at a time after the time i.

3. The wireless communication system of claim 1 wherein the transceiver further comprises circuitry for transmitting communications synchronized in response to the count in the counter.

4. The wireless communication system of claim 1 wherein the transceiver further comprises:
   circuitry for transmitting communications synchronized in response to the count in the counter after the count is adjusted by the circuitry for adjusting the inaccurate count to a perceived accurate count;
   circuitry for providing a compensated count representing the count in the counter prior to being adjusted by the circuitry for adjusting the inaccurate count; and
   circuitry for receiving communications synchronized in response to the compensated count.

5. The wireless communication system of claim 1:
   wherein the transceiver further comprises a global position satellite receiver; and
   wherein the time message is a global position satellite time message received by the global position satellite receiver.

6. The wireless communication system of claim 1:
   wherein the code counter comprises a first code counter;
   wherein the transceiver further comprises a second code counter;
   wherein the clock oscillator is further for advancing a count in the second code counter; and
   wherein the transceiver further comprises:
      circuitry for storing the system time count to the second code counter, wherein the second code counter continues to be advanced from the system time count in response to the clock oscillator;
      circuitry for repeatedly evaluating the count in the second code counter, after advancement from the system time count, to ascertain whether the count in the second code counter has drifted to an inaccurate count; and
      circuitry, responsive to detecting an inaccurate count in the second code counter, for adjusting the inaccurate count in the second code counter to a perceived accurate count.

7. The wireless communication system of claim 6 wherein the first code counter comprises a long code counter and wherein the second code counter comprises a short code counter.

8. The wireless communication system of claim 1 wherein the clock oscillator comprises a free running clock oscillator.

9. The wireless communication system of claim 1:
   wherein the code counter comprises a long code counter for counting a long code comprising a number of chips X and for modulating a signal to be transmitted at a chip rate $F_{chip}$;
   wherein the time message includes a time indication i representing a time difference from an origin time to a time that the time message was transmitted; and
   wherein the circuitry for determining a system time count determines the system time count at time i to be equal to $$i \times F_{chip} - (X) \times \text{round}\left[\frac{i \times F_{chip}}{X}\right].$$

10. The wireless communication system of claim 1:
wherein the counter has a bit precision operable to count 1/x bits; and
wherein the circuitry for adjusting the inaccurate count adjusts the inaccurate count by altering the count in the counter a total number of x times over x evenly spaced periods.

11. The wireless communication system of claim 1 wherein the transceiver comprises a code division multiple access transceiver.

12. The wireless communication system of claim 1 wherein the circuitry for repeatedly evaluating and the circuitry for adjusting are part of a digital signal processor.

13. The wireless communication system of claim 1 wherein the transceiver comprises a base station transceiver.

14. The wireless communication system of claim 1:
wherein the transceiver comprises a first transceiver for transmitting communications synchronized in response to the count in the counter; and
further comprising a second transceiver for receiving the communications synchronized in response to the count in the counter.

15. A wireless communication system, comprising:
a transceiver, comprising:
a code counter;
a clock oscillator for advancing a count in the code counter;
a global position satellite receiver for receiving a global position satellite time message on a GPS system time;
circuitry for determining a system time count and for storing the system time count to the code counter in response to the time message, wherein the code counter continues to be advanced from the system time count in response to the clock oscillator;
circuitry for repeatedly evaluating the count in the code counter, after advancement from the system time count, to ascertain whether the count has drifted to an inaccurate count; and
circuitry, responsive to detecting an inaccurate count, for adjusting the inaccurate count to a perceived accurate count;
circuitry for transmitting communications synchronized in response to the count in the counter;
wherein the code counter comprises a long code counter for counting a long code comprising a number of chips X and for modulating a signal to be transmitted at a chip rate $F_{chip}$;
wherein the time message includes a time indication i representing a time difference from an origin time to a time that the time message was transmitted; and
wherein the circuitry for determining a system time count determines the system time count at time i to be equal to $$i \times F_{chip} - (X) \times \text{round}\left[\frac{i \times F_{chip}}{X}\right].$$

16. The wireless communication system of claim 15 wherein the system time count is determined relative to a time i and wherein the transceiver further comprises:
circuitry for initializing an initial count into the counter prior to storing the system time count to the code counter;
circuitry for determining an estimated offset between the system time count and the count in the code counter at the time i; and
circuitry for adding the estimated offset to the count in the code counter at a time after the time i.

17. The wireless communication system of claim 15 wherein the transceiver further comprises circuitry for transmitting communications synchronized in response to the count in the counter.

18. The wireless communication system of claim 15 wherein the transceiver comprises a code division multiple access transceiver.

19. The wireless communication system of claim 15 wherein the circuitry for repeatedly evaluating and the circuitry for adjusting are part of a digital signal processor.

20. The wireless communication system of claim 15 wherein the transceiver comprises a base station transceiver.

21. A method of operating a wireless communication system including a transceiver, comprising the steps of operating the transceiver by:
advancing a code counter with a clock oscillator;
receiving a time message based on a system time external from the transceiver;
determining a system time count and for storing the system time count to the code counter in response to the time message, wherein the code counter continues to be advanced from the system time count in response to the clock oscillator;
repeatedly evaluating the count in the code counter, after advancement from the system time count, to ascertain whether the count has drifted to an inaccurate count; and
responsive to detecting an inaccurate count, for adjusting the inaccurate count to a perceived accurate count.

22. The method of claim 21 wherein the system time count is determined relative to a time i and further comprising the steps of operating the transceiver by:
initializing an initial count into the counter prior to storing the system time count to the code counter;
determining an estimated offset between the system time count and the count in the code counter at the time i; and
adding the estimated offset to the count in the code counter at a time after the time i.

23. The method of claim 21 and further comprising the steps of operating the transceiver by transmitting communications synchronized in response to the count in the counter.

24. The method of claim 21 wherein the time message is a global position satellite time message.

25. The method of claim 21 wherein the transceiver comprises a code division multiple access transceiver.

26. The method of claim 21:
wherein the transceiver comprises a first transceiver for transmitting communications synchronized in response to the count in the counter; and
further comprising the step of operating a second transceiver for receiving the communications synchronized in response to the count in the counter.

* * * * *